US012665508B2

(12) United States Patent
Huang et al.

(10) Patent No.: US 12,665,508 B2
(45) Date of Patent: Jun. 23, 2026

(54) HYBRID SENSING CIRCUITS FOR SWITCHING DIRECT-CURRENT-TO-DIRECT-CURRENT CONVERTERS, AND ASSOCIATED SYSTEMS AND METHODS

(71) Applicant: Analog Devices, Inc., Wilmington, MA (US)

(72) Inventors: Xingxuan Huang, San Jose, CA (US); Xinyu Liang, Santa Clara, CA (US)

(73) Assignee: Analog Devices, Inc., Wilmington, MA (US)

( * ) Notice: Subject to any disclaimer, the term of this patent is extended or adjusted under 35 U.S.C. 154(b) by 208 days.

(21) Appl. No.: 18/731,156

(22) Filed: May 31, 2024

(65) Prior Publication Data

US 2025/0373157 A1     Dec. 4, 2025

(51) Int. Cl.
H02M 3/156     (2006.01)
H02M 1/14      (2006.01)
H02M 3/158     (2006.01)
H02M 1/00         (2006.01)

(52) U.S. Cl.
CPC ............. H02M 3/156 (2013.01); H02M 1/14 (2013.01); H02M 3/158 (2013.01); H02M 1/0025 (2021.05)

(58) Field of Classification Search
CPC ........ H02M 3/156; H02M 1/14; H02M 3/158; H02M 1/0025
See application file for complete search history.

(56) References Cited

U.S. PATENT DOCUMENTS 6,801,082 B2 * 10/2004 Midya .................. H03F 1/0277
                                                  330/136
7,212,012 B1     5/2007 Zhang
                       (Continued)

FOREIGN PATENT DOCUMENTS

GB          2452285 A       3/2009

OTHER PUBLICATIONS

Extended European Search Report received for European Patent Application No. 25179210.7, mailed on Oct. 1, 2025, 10 pages.
(Continued)

*Primary Examiner* — Yusef A Ahmed
(74) *Attorney, Agent, or Firm* — ArentFox Schiff LLP

(57)     ABSTRACT

A hybrid sensing circuit for generating a control signal for controlling a switching direct-current-to-direct-current (DC-to-DC) converter where (i) the switching DC-to-DC converter includes a first inductor-capacitor (LC) filter and (ii) a second LC filter is electrically coupled between a local output node and a remote output node of the switching DC-to-DC converter. The hybrid sensing circuit includes (a) one or more first amplifiers configured to generate a first amplifier output signal proportional to a dynamic voltage at the local output node, (b) one or more second amplifiers configured to generate a second amplifier output signal proportional to a difference between (i) a desired output voltage of the switching DC-to-DC converter and (ii) an output voltage of the switching DC-to-DC converter at the remote output node, and (c) summing circuitry configured to generate a control signal based on a sum of the first and second amplifier output signals.

11 Claims, 12 Drawing Sheets

(56)　　　　　References Cited

U.S. PATENT DOCUMENTS

| | | | | |
|---|---|---|---|---|
| 7,548,047 | B1* | 6/2009 | Dasgupta | H02M 3/156 |
| | | | | 323/283 |
| 9,041,363 | B2* | 5/2015 | Tanabe | H02M 3/1582 |
| | | | | 323/259 |
| 9,391,578 | B2 | 7/2016 | Khan et al. | |
| 10,044,265 | B1* | 8/2018 | Ozawa | H03F 3/195 |
| 2003/0102849 | A1* | 6/2003 | Schiff | H02M 3/1584 |
| | | | | 323/222 |
| 2009/0146634 | A1* | 6/2009 | Audy | H02M 3/156 |
| | | | | 323/290 |
| 2010/0027301 | A1* | 2/2010 | Hoyerby | H02M 3/1563 |
| | | | | 363/39 |
| 2012/0194141 | A1* | 8/2012 | Shi | H02J 7/92 |
| | | | | 320/137 |
| 2013/0002212 | A1* | 1/2013 | Fan | H02M 3/156 |
| | | | | 323/235 |
| 2014/0132232 | A1* | 5/2014 | MacLean | H02M 3/1588 |
| | | | | 323/271 |
| 2014/0253064 | A1* | 9/2014 | Swanson | H02M 3/1584 |
| | | | | 323/272 |
| 2014/0253082 | A1* | 9/2014 | Swanson | H02M 3/156 |
| | | | | 323/284 |
| 2014/0292298 | A1* | 10/2014 | Pradhan | H02M 3/1588 |
| | | | | 323/286 |
| 2015/0155783 | A1* | 6/2015 | Li | H03F 3/2173 |
| | | | | 323/271 |
| 2015/0162829 | A1* | 6/2015 | Chiu | H02M 3/156 |
| | | | | 323/271 |
| 2016/0006397 | A1* | 1/2016 | Wimpenny | H03F 3/19 |
| | | | | 330/297 |
| 2017/0047843 | A1* | 2/2017 | Bawa | H02M 3/156 |
| 2021/0028698 | A1* | 1/2021 | Chen | H02M 7/06 |
| 2021/0184563 | A1* | 6/2021 | Ruan | H02M 3/158 |
| 2022/0286043 | A1* | 9/2022 | Nam | H02M 1/385 |
| 2022/0416652 | A1* | 12/2022 | Huang | H02M 1/348 |
| 2023/0031068 | A1* | 2/2023 | Quintero | H02M 7/217 |
| 2023/0336078 | A1* | 10/2023 | Bertolini | H02M 3/07 |

OTHER PUBLICATIONS

Hoyerby et al., "Envelope Tracking Power Supply with Fully Controlled 4th Order Output Filter", IEEE, 2006, pp. 993-1000.

Yang, Modeling and Control for a Current-Mode Buck Converter with a Secondary LC Filter, Analog Dialogue 51-10, Oct. 2018, 8 pages.

* cited by examiner

200

300

302

HYBRID SENSING CIRCUITS FOR SWITCHING DIRECT-CURRENT-TO-DIRECT-CURRENT CONVERTERS, AND ASSOCIATED SYSTEMS AND METHODS

BACKGROUND

Switching direct-current-to-direct-current (DC-to-DC) converters are widely used in electronic devices, such as to provide a regulated electric power supply. A switching DC-to-DC converter is configured such that its solid-state power switching devices do not continuously operate in their linear states; instead, the switching devices repeatedly switch between their on-states and off-states to repeatedly charge and discharge an energy storage device, such as an inductor. This repeated charging and discharging of the energy storage device generates ripple current and associated ripple voltage. Additionally, noise may be generated by the switching devices transitioning between their on-states and off-states.

DETAILED DESCRIPTION OF THE EMBODIMENTS

More and more switching direct-current-to-direct-current (DC-to-DC) converter applications require that an output voltage of the switching DC-to-DC converter have low ripple and low noise. For example, radio frequency applications, signal chain applications, wireless communication applications, instrumentation applications, and industrial applications frequently require a very clean power supply, i.e., a power supply with low voltage ripple and low noise. Accordingly, a second inductor-capacitor (LC) filter is frequently added to an output of a switching DC-to-DC converter to attenuate output voltage ripple and noise. However, this second LC filter complicates switching DC-to-DC converter control. Specifically, the second LC filter adds a double pole to a control loop of the switching DC-to-DC converter, which may make it difficult to obtain both high control loop bandwidth and high phase margin. As such, a switching DC-to-DC converter with a second LC filter connected to its output may have poor transient response and may even be prone to oscillation. This drawback is particularly acute in inverting switching DC-to-DC converters, such as inverting buck-boost switching DC-to-DC converters, with unity feedback gain.

Disclosed herein are new hybrid sensing circuits for switching DC-to-DC converters which at least partially overcome the above-discussed drawbacks. The new hybrid sensing circuits include respective amplifiers for sensing voltage at both a local output node of the switching DC-to-DC converter and a remote output node of the switching DC-to-DC converter, where a second LC filter is electrically coupled between the local output node and the remote output node. One or more first amplifiers are configured to generate a first amplifier output signal proportional to a dynamic voltage at the local output node. One or more second amplifiers are configured to generate a second amplifier output signal proportional to a difference between (i) a desired output voltage of the switching DC-to-DC converter and (ii) output voltage of the switching DC-to-DC converter at the remote output node. The hybrid sensing circuits further include summing circuitry configured to generate a control signal for controlling the switching DC-to-DC converter based on a sum of the first amplifier output signal and the second amplifier output signal. In particular embodiments, a ratio of a gain of the one or more first amplifiers to a gain of the one or more second amplifiers is a function of a ratio of a capacitance of the first LC filter to a capacitance of the second LC filter, to create a double-zero which counteracts a double-pole of the second LC filter. As such, the new hybrid sensing circuits advantageously enable a control loop of a switching DC-to-DC converter with a second LC filter connected to its output to achieve high bandwidth and high phase margin, thereby promoting low ripple voltage magnitude, low noise, and fast transient response.

Figure 1:
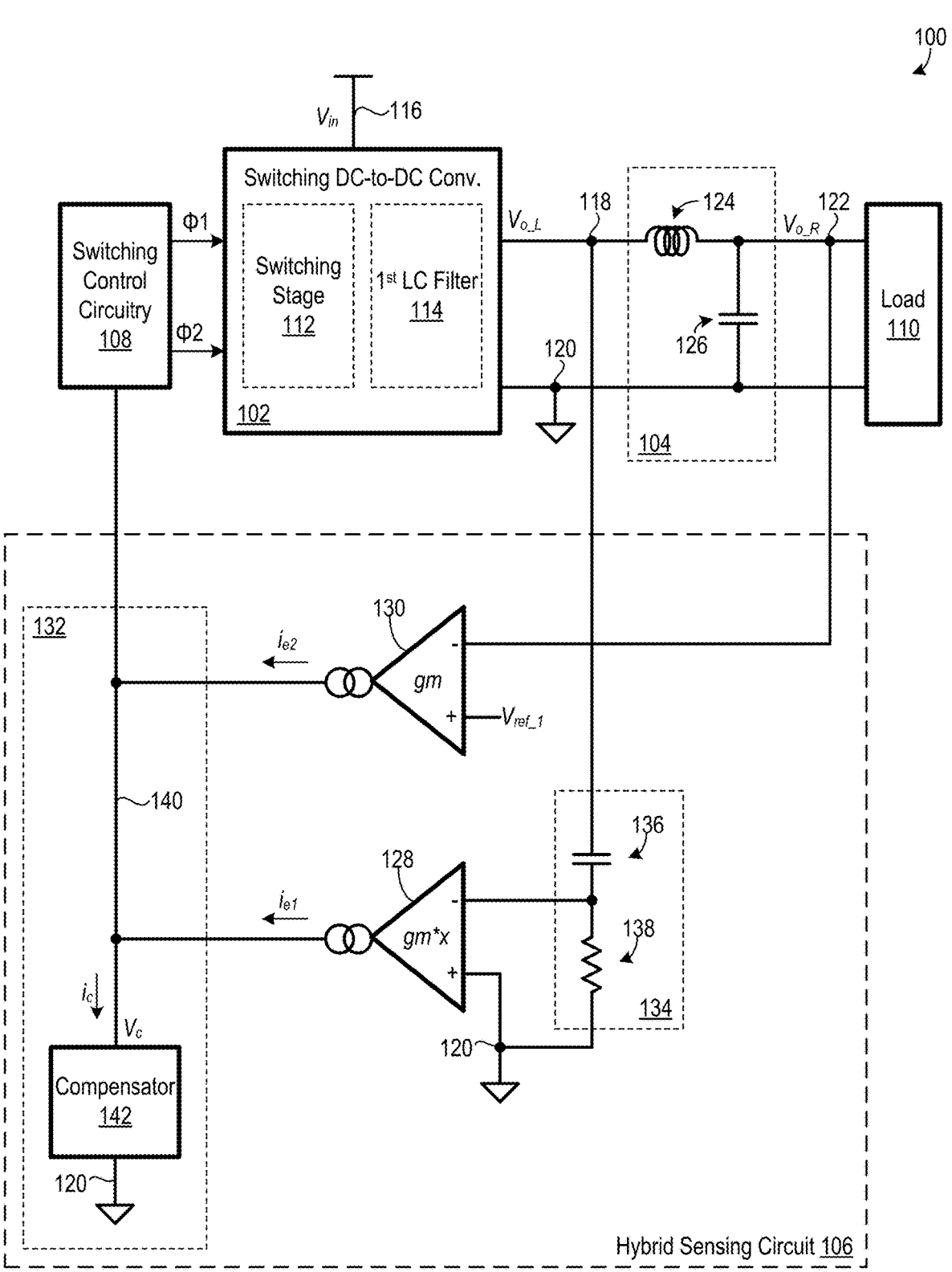
FIG. 1 is a schematic diagram of an electrical environment including a hybrid sensing circuit for generating a control signal for controlling a switching direct-current-to-direct-current (DC-to-DC) converter, according to an embodiment.

FIG. 1 is a schematic diagram of an electrical environment 100 including a switching DC-to-DC converter 102, a second LC filter 104, a hybrid sensing circuit 106, switching control circuitry 108, and a load 110, where hybrid sensing circuit 106 is an embodiment of the new hybrid sensing circuits disclosed herein. Switching DC-to-DC converter 102 has a non-inverting topology and includes a switching stage 112 and a first LC filter 114, which are symbolically shown in FIG. 1 by boxes with dashed outlines. Example topologies of switching DC-to-DC converter 102 include, but are not limited to, a buck topology and a boost topology. The configuration of switching stage 112 and first LC filter 114 will depend on the topology of switching DC-to-DC converter 102. Switching DC-to-DC converter 102 is configured to operate under the command of control signals Φ1 and Φ2 generated by switching control circuitry 108 (discussed below) to convert an input voltage $V_{in}$ on an input node 116 to a local output voltage $V_{o\_L}$ on a local output node 118 of switching DC-to-DC converter 102. Input voltage $V_{in}$ and local output voltage $V_{o\_L}$ have a common polarity. Voltages in electrical environment 100 are referenced to a reference node 120, which is depicted as being a ground node, such as an earth ground or a chassis ground. However, reference node 120 need not be a ground node, and reference node 120 could accordingly be at a different electrical potential than an earth ground or a chassis ground.

Second LC filter 104 is electrically coupled between local output node 118 and a remote output node 122 of switching DC-to-DC converter 102. Second LC filter 104 includes an inductor 124 and a capacitor 126. Inductor 124 is electrically coupled between local output node 118 and remote output node 122, and capacitor 126 is electrically coupled between remote output node 122 and reference node 120. Load 110 is electrically coupled between remote output node 122 and reference node 120, and load 110 is accordingly powered from switching DC-to-DC converter 102 via second LC filter 104. Remote output node 122 has a remote output voltage $V_{o\_R}$.

Hybrid sensing circuit 106 includes a first transconductance amplifier 128, a second transconductance amplifier 130, summing circuitry 132, and a high pass filter 134. High pass filter 134 electrically couples local output node 118 to an inverting input of first transconductance amplifier 128, and high pass filter 134 includes a capacitor 136 and a resistor 138. Capacitor 136 is electrically coupled between local output node 118 and the inverting input of first transconductance amplifier 128, and resistor 138 is electrically coupled between the inverting input of first transconductance amplifier 128 and reference node 120. A non-inverting input of first transconductance amplifier 128 is electrically coupled to reference node 120. First transconductance amplifier 128 is configured to generate a first amplifier output current signal $i_{e1}$ proportional to a dynamic voltage at local output node 118. The dynamic voltage at local output node 118, includes, for example, ripple of local output voltage $V_{o\_L}$ and/or variation of local output voltage $V_{o\_L}$ due to transient loading of switching DC-to-DC converter 102. First transconductance amplifier 128 has a gain (transconductance) of gm\*x, where x is a scaling factor, as discussed below.

An inverting input of second transconductance amplifier 130 is electrically coupled to remote output node 122, and a non-inverting input of second transconductance amplifier 130 receives a reference voltage $V_{ref\_1}$, where $V_{ref\_1}$ is equal to a desired output voltage of switching DC-to-DC converter 102, e.g., a desired value of remote output voltage $V_{o\_R}$. Accordingly, second transconductance amplifier 130 is configured to generate a second amplifier output current signal $i_{e2}$ proportional to a difference between (i) the desired output voltage of switching DC-to-DC converter 102 and (ii) the output voltage of the switching DC-to-DC converter 102 at remote output node 122. Second transconductance amplifier

130 has a gain (transconductance) of gm, where gm is the same as discussed above with respect to first transconductance amplifier 128.

Summing circuitry 132 is configured to generate a control signal $V_c$ for controlling switching DC-to-DC converter 102 based on a sum of first amplifier output current signal $i_{e2}$ and second amplifier output current signal $i_{e2}$. Specifically, summing circuitry 132 includes a summing node 140 and a compensator 142. Summing node 140 is electrically coupled to the output of first transconductance amplifier 128, the output of second transconductance amplifier 130, and switching control circuitry 108. Switching control circuitry 108 has a high input impedance such that negligible electric current flows from summing node 140 to switching control circuitry 108. Accordingly, summing node 140 sums each of first amplifier output current signal $i_{e1}$ and second amplifier output current signal lez to generate a combined current signal $i_c$ flowing from summing node 140 into compensator 142. Compensator 142 is electrically coupled between summing node 140 and reference node 120, and compensator 142 is an impedance element that is configured to convert combined current signal $i_c$ to control signal Ve. For example, in certain embodiments, compensator 142 includes a resistive-capacitive (RC) network electrically coupled between summing node 140 and reference node 120, where (i) the RC network is selected to achieve a desired closed-loop frequency response of switching DC-to-DC converter 102 and (ii) control signal $V_c$ is equal to the product of combined current signal $i_c$ and impedance of the RC network.

Switching control circuitry 108 is configured to control switching stage 112 by generating controls signals Φ1 and Φ2 as a function of control signal $V_c$. Control signal Φ1 controls a control switching device (not shown in FIG. 1) of switching stage 112, and control signal Φ2 controls a freewheeling switching device (not shown in FIG. 1) of switching stage 112. Examples of a control switching device of switching stage 112 and a freewheeling switching device of switching stage 112 are discussed below with respect to FIGS. 4 and 5. Hybrid sensing circuit 106 and switching control circuitry 108 collectively modulate duty cycle of the control switching device via control signals $V_c$ and Φ1 to regulate magnitude of local output voltage $V_{o\_L}$ and remote output voltage $V_{o\_R}$. Switching control circuitry 108 controls the freewheeling switching device such that the freewheeling switching device provides a path for current flowing through an inductor (not shown in FIG. 1) of first LC filter 114 when the control switching device is in its off-state. In this document, a switching device is in its on-state when the switching device is being controlled to operate in its conductive state, and the switching device is in its off-state when the switching device is being controlled to operate in its non-conductive state. In some embodiments, the freewheeling switching device of switching stage 112 is replaced with a diode, and switching control circuitry 108 therefore need not be capable of generating control signal Φ2.

Figure 2:
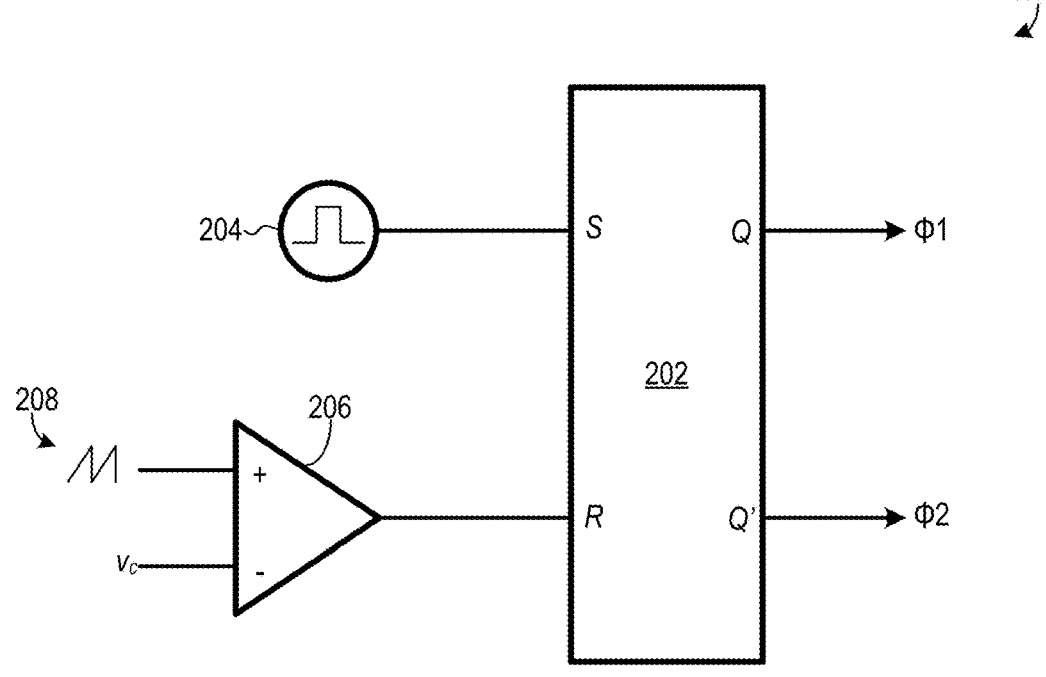
FIG. 2 is a schematic diagram of one embodiment of switching control circuitry of the FIG. 1 electrical environment.

The configuration of switching control circuitry 108 is a design choice. In some embodiments, switching control circuitry 108 is configured to generate control signals Φ1 and Φ2 as a function of control signal $V_c$ using a pulse width modulation (PWM) technique or a pulse frequency modulation (PFM) technique. For example, FIG. 2 is a schematic diagram of switching control circuitry 200, where switching control circuitry 200 is one possible embodiment of switching control circuitry 108 that uses a PWM technique, although it is understood that switching control circuitry 108 could be embodied in other manners. Switching control circuitry 200 includes a flip-flop 202, a clock 204, and a comparator 206. A first output Q of flip-flop 202 generates control signal Φ1, and a second output Q' of flip-flop 202 generates control signal Φ2, where second output Q' is complementary to first output Q. Each control signal Φ1 and Φ2 is asserted when in a logic-high state, and each control signal Φ1 and Φ2 is de-asserted when in a logic-low state. Clock 204 is electrically coupled to an S input of flip-flop 202, and flip-flop 202 is set when input S goes high. Clock 204 periodically generates a timing pulse with triggers flip-flop 202, thereby causing control signal Φ1 to be asserted. An output of comparator 206 is electrically coupled to an R input of flip-flop 202, and flip-flop 202 is reset when input R goes high. Comparator 206 compares a ramp signal 208 to control signal $V_c$, (from summing circuitry 132 of FIG. 1), and the output of comparator 206 goes high, thereby causing control signal Φ1 to be de-asserted, in response to magnitude of ramp signal 208 exceeding magnitude of control signal $V_c$. While FIG. 2 depicts ramp signal 208 as being a sawtooth waveform, ramp signal 208 could have other shapes. For example, ramp signal 208 could be a triangle waveform in embodiments of switching control circuitry 200 supporting current mode control. Switching control circuitry 200 could include additional elements, such as elements for supporting slope compensation and/or elements for inserting deadtime between assertion of controls signals Φ1 and Φ2, without departing from the scope hereof.

Figure 3:
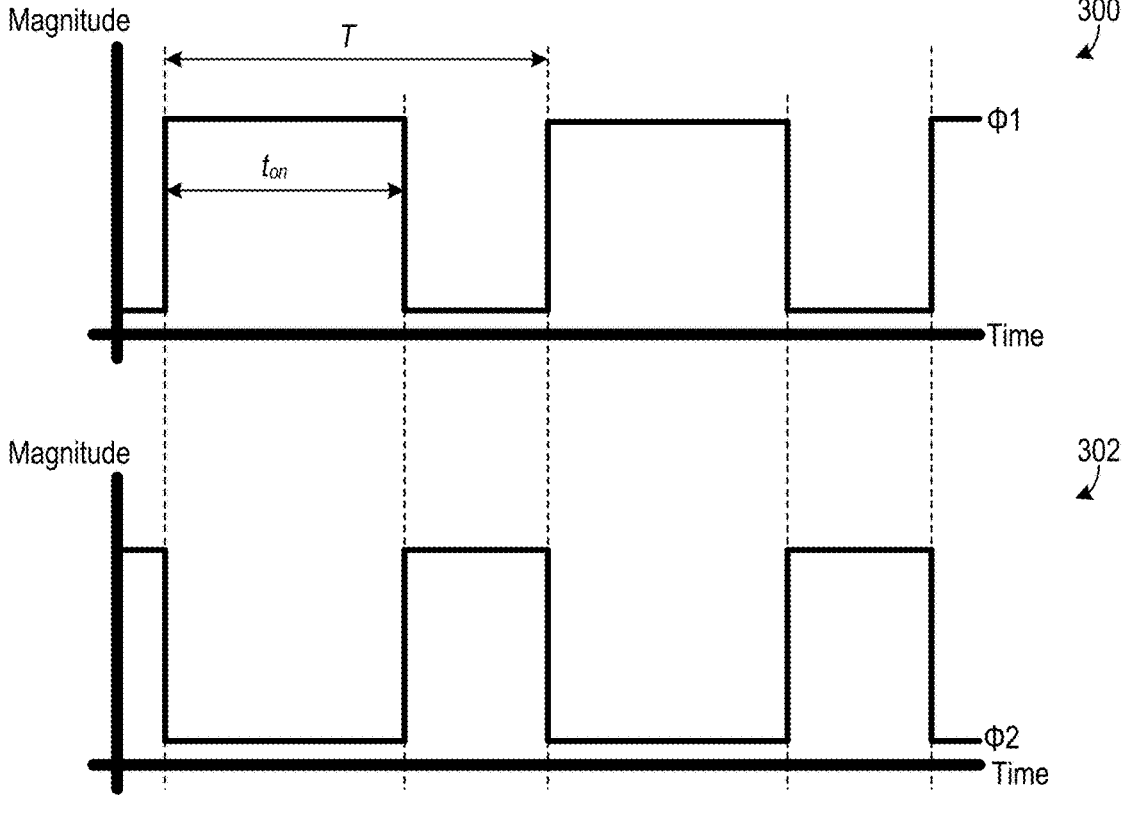
FIG. 3 includes two graphs illustrating one example of operation of the FIG. 2 switching control circuitry.

FIG. 3 includes two graphs 300 and 302 collectively illustrating one example of control signals Φ1 and Φ2 as generated by switching control circuitry 200. Graph 300 is of magnitude of control signal Φ1 versus time, and graph 302 is of magnitude of control signal Φ2 versus time. Graphs 300 and 302 have a common time base. Control signal Φ1 has a duty cycle D of $t_{on}/T$ in the FIG. 3 example, and control signal Φ2 is complementary to control signal Φ1. Duty cycle D increases with increasing magnitude of control signal $V_c$, and duty cycle D decreases with decreasing magnitude of control signal $V_c$, in switching control circuitry 200.

Referring again to FIG. 1, while second LC filter 104 reduces magnitude of ripple and noise on remote output voltage $V_{o\_R}$, second LC filter 104 introduces a double-pole in a control loop for switching DC-to-DC converter 102. However, hybrid sensing circuit 106 can advantageously be configured to generate a double-zero to compensate for the double-pole of second LC filter 104, thereby mitigating (or even eliminating) the above-discussed drawbacks of electrically coupling a second LC filter to an output node of a switching DC-to-DC converter. In particular, second LC filter 104 introduces a double-pole at a frequency $f_{dp}$, as specified by EQN. 1 below, where $L_2$ is inductance of inductor 124 of second LC filter 104, $C_1$ is capacitance of a capacitor (not shown) of first LC filter 114, $C_2$ is capacitance of capacitor 126 of second LC filter 104, and $C_1 \| C_2$ is a collective capacitance of a series combination of $C_1$ and $C_2$.

$$f_{dp} = \frac{1}{2\pi\sqrt{L_2(C_1 \| C_2)}} \qquad \text{(EQN. 1)}$$

On the other hand, hybrid sensing circuit 106 generates a double-zero at a frequency $f_{dz}$ specified by EQN. 2 below, where x is the scaling factor discussed above with respect to the gain of first transconductance amplifier 128 and $L_2$ and $C_2$ are as discussed above with respect to EQN. 1.

$$f_{dz} = \frac{1}{2\pi\sqrt{\frac{x}{x+1}L_2C_2}} \qquad \text{(EQN. 2)}$$

As such, the double-zero generated by hybrid sensing circuit 106 will be at the same frequency as the double-pole of second LC filter 104, such that the double-zero cancels the double-pole, if EQN. 3 below holds true.

$$x = \frac{C_1}{C_2} \qquad \text{(EQN. 3)}$$

Accordingly, in particular embodiments, a ratio of a gain (transconductance gm*x) $G_1$ of first transconductance amplifier 128 to a gain (transconductance gm) $G_2$ of second transconductance amplifier 130 is specified by EQN. 4 below, where $C_1$ is capacitance of the capacitor of first LC filter 114 and $C_2$ is capacitance of capacitor 126 of second LC filter 104, as discussed above, so that the double-zero generated by hybrid sensing circuit 106 compensates for the double-pole introduced by second LC filter 104. As such, in particular embodiments, gain (transconductance gm*x) $G_1$ of first transconductance amplifier 128 will be different from gain (transconductance gm) $G_2$ of second transconductance amplifier 130, unless $C_1$ is equal to $C_2$.

$$\frac{G_1}{G_2} = \frac{C_1}{C_2} \qquad \text{(EQN. 4)}$$

It should be noted that EQN. 4 is not a function of inductance. As such, hybrid sensing circuit 106 is capable of compensating for the double-pole introduced by second LC filter 104 irrespective of how large is the value of inductance of second LC filter 104. Consequently, second LC filter 104 can be configured to have a large inductance value, thereby promoting attenuation of ripple and noise in remote output voltage $V_{o\_R}$, without negatively impacting control of switching DC-to-DC converter 102.

Discussed with respect to FIGS. 4 and 5 below are two example embodiments of switching DC-to-DC converter 102 of FIG. 1. It is understood, though, that switching DC-to-DC converter 102 is not limited to the example embodiments of FIGS. 4 and 5.

Figure 4:
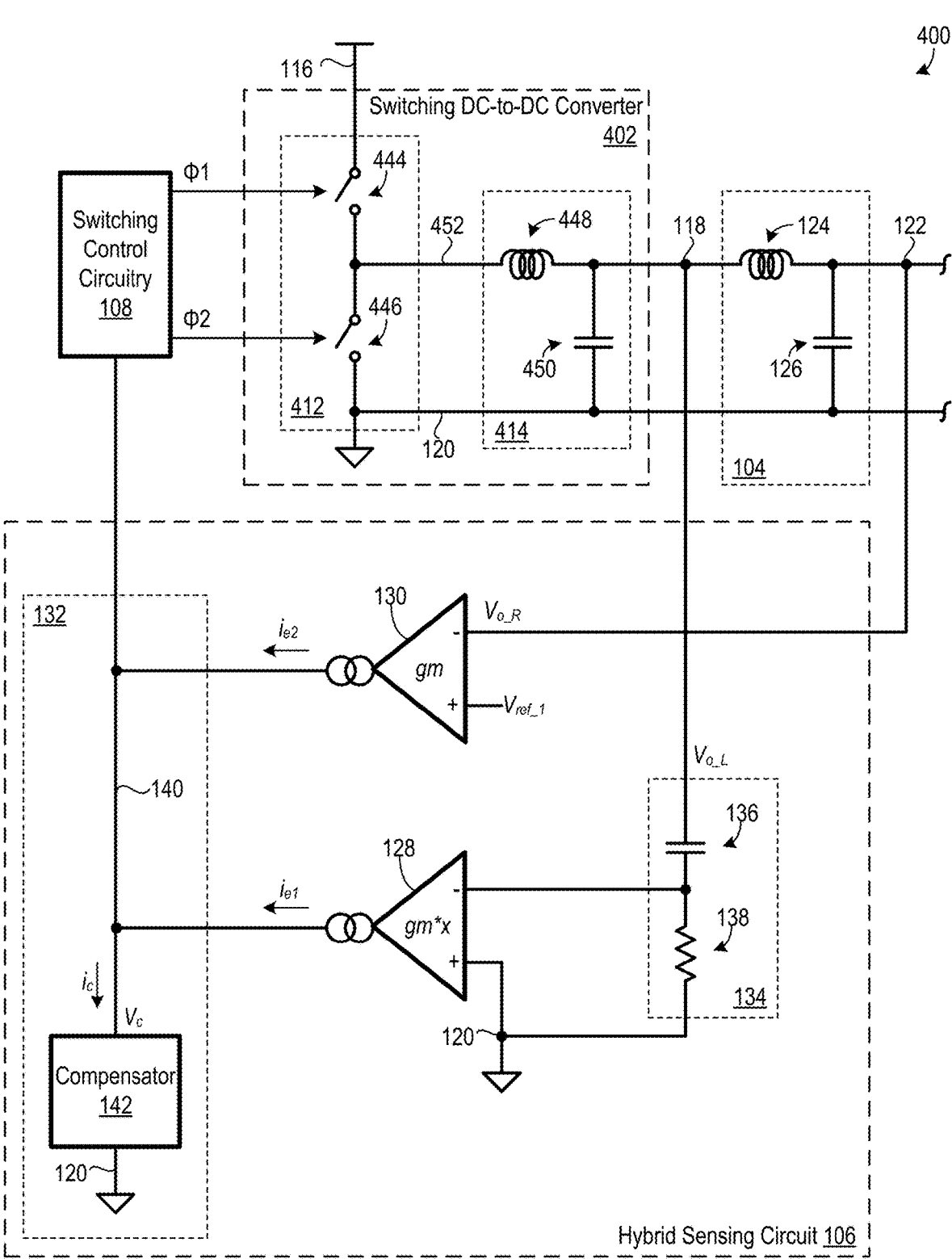
FIG. 4 is a schematic diagram of an embodiment of the FIG. 1 electrical environment where the switching DC-to-DC converter has a buck topology.

FIG. 4 is a schematic diagram of an electrical environment 400, which is an embodiment of electrical environment 100 (FIG. 1) where switching DC-to-DC converter 102 is embodied by a switching DC-to-DC converter 402 having a buck topology. Load 110 is not shown in FIG. 4 for illustrative clarity. Switching stage 112 and first LC filter 114 of FIG. 1 are embodied by a switching stage 412 and a first LC filter 414, respectively, in FIG. 4. Switching stage 412 includes a control switching device 444 and a freewheeling switching device 446, and first LC filter 414 includes an inductor 448 and a capacitor 450. Control switching device 444 is controlled by control signal Φ1, and control switching device 444 is electrically coupled between input node 116 and a switching node 452. Freewheeling switching device 446 is controlled by control signal Φ2, and freewheeling switching device 446 is electrically coupled between switching node 452 and reference node 120. Inductor 448 is electrically coupled between switching node 452 and local output node 118, and capacitor 450 is electrically coupled between local output node 118 and reference node 120.

Capacitance of capacitor 450 is an example of capacitance C discussed above with respect to EQNS. 1, 3, and 4.

Figure 5:
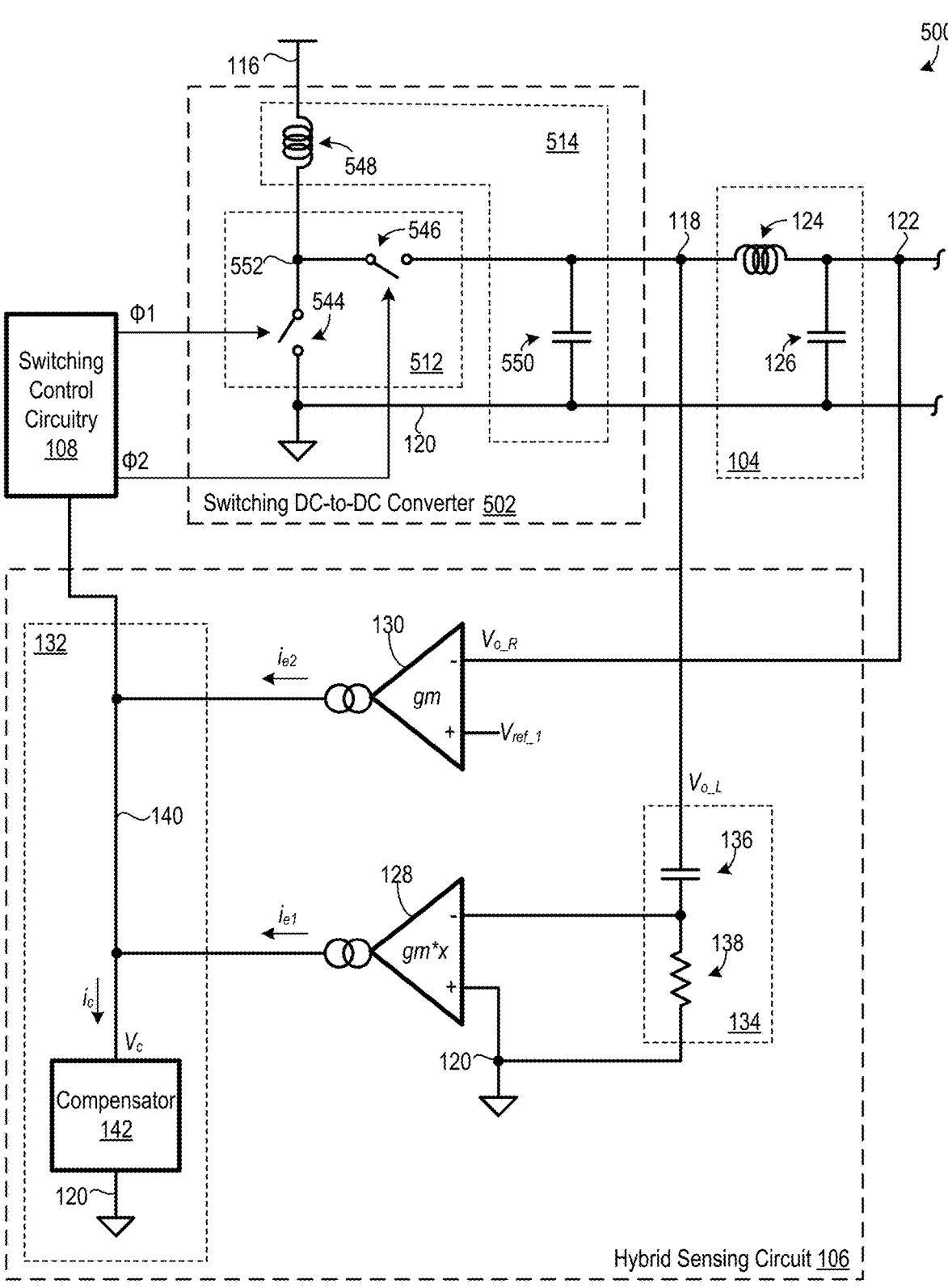
FIG. 5 is a schematic diagram of an embodiment of the FIG. 1 electrical environment where the switching DC-to-DC converter has a boost topology.

FIG. 5 is a schematic diagram of an electrical environment 500, which is an embodiment of electrical environment 100 (FIG. 1) where switching DC-to-DC converter 102 is embodied by a switching DC-to-DC converter 502 having a boost topology. Load 110 is not shown in FIG. 5 for illustrative clarity. Switching stage 112 and first LC filter 114 of FIG. 1 are embodied by a switching stage 512 and a first LC filter 514, respectively, in FIG. 5. Switching stage 512 includes a control switching device 544 and a freewheeling switching device 546, and first LC filter 514 includes an inductor 548 and a capacitor 550. Control switching device 544 is controlled by control signal $\Phi 1$, and control switching device 544 is electrically coupled between a switching node 552 and reference node 120. Freewheeling switching device 546 is controlled by control signal $\Phi 2$, and freewheeling switching device 546 is electrically coupled between switching node 552 and local output node 118. Inductor 548 is electrically coupled between input node 116 and switching node 552, and capacitor 550 is electrically coupled between local output node 118 and reference node 120. Capacitance of capacitor 550 is another example of capacitance $C_1$ discussed above with respect to EQNS. 1, 3, and 4.

Figure 6:
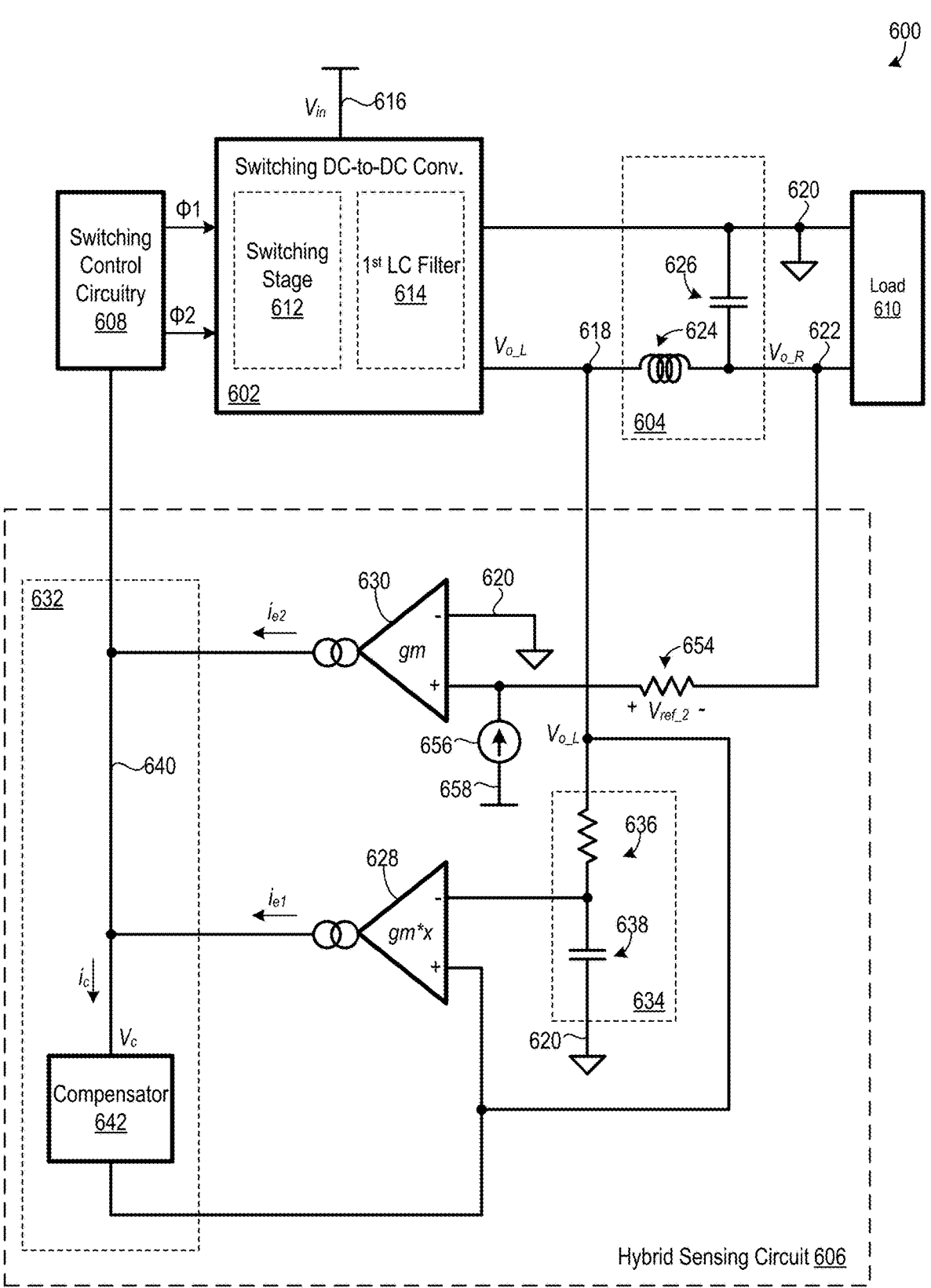
FIG. 6 is a schematic diagram of an electrical environment including another hybrid sensing circuit for generating a control signal for controlling a switching DC-to-DC converter, according to an embodiment.

The new hybrid sensing circuits disclosed herein can be configured to work with a switching DC-to-DC converter having an inverting topology as well as with a switching DC-to-DC converter having a non-inverting topology. For example, FIG. 6 is a schematic diagram of an electrical environment 600 includes a switching DC-to-DC converter 602, a second LC filter 604, a hybrid sensing circuit 606, switching control circuitry 608, and a load 610, where hybrid sensing circuit 606 is another embodiment of the new hybrid sensing circuits disclosed herein. Switching DC-to-DC converter 602 has an-inverting topology and includes a switching stage 612 and a first LC filter 614, which are symbolically shown in FIG. 6 by boxes with dashed outlines. An example topology of switching DC-to-DC converter 602 includes, but is not limited to, a buck-boost topology. The configuration of switching stage 612 and first LC filter 614 will depend on the topology of switching DC-to-DC converter 602. Switching DC-to-DC converter 602 is configured to operate under the command of control signals $\Phi 1$ and $\Phi 2$ generated by switching control circuitry 608 (discussed below) to convert an input voltage $V_{in}$ on an input node 616 to a local output voltage $V_{o\_L}$ on a local output node 618 of switching DC-to-DC converter 602. It should be noted that local output voltage $V_{o\_L}$ has an opposite polarity of input voltage $V_{in}$. Voltages in electrical environment 600 are referenced to a reference node 620, which is depicted as being a ground node, such as an earth ground or a chassis ground. However, reference node 620 need not be a ground node, and reference node 620 could accordingly be at a different electrical potential than an earth ground or a chassis ground.

Second LC filter 604 is electrically coupled between local output node 618 and a remote output node 622 of switching DC-to-DC converter 602. Second LC filter 604 includes an inductor 624 and a capacitor 626. Inductor 624 is electrically coupled between local output node 618 and remote output node 622, and capacitor 626 is electrically coupled between remote output node 622 and reference node 620. Load 610 is electrically coupled between remote output node 622 and reference node 620, and load 610 is accordingly powered from switching DC-to-DC converter 602 via second LC filter 604. Remote output node 622 has a remote output voltage $V_{o\_R}$.

Hybrid sensing circuit 606 includes a first transconductance amplifier 628, a second transconductance amplifier 630, summing circuitry 632, a low pass filter 634, a resistor 654, and a current source 656. Low pass filter 634 electrically couples local output node 618 to an inverting input of first transconductance amplifier 628, and low pass filter 634 includes a resistor 636 and a capacitor 638. Resistor 636 is electrically coupled between local output node 618 and the inverting input of first transconductance amplifier 628, and capacitor 638 is electrically coupled between the inverting input of first transconductance amplifier 628 and reference node 620. A non-inverting input of first transconductance amplifier 628 is electrically coupled to local output node 618. First transconductance amplifier 628 is configured to generate a first amplifier output current signal $i_{e1}$ proportional to a dynamic voltage at local output node 618. The dynamic voltage at local output node 618, includes, for example, ripple of local output voltage $V_{o\_L}$ and/or variation of local output voltage $V_{o\_L}$ due to transient loads applied to switching DC-to-DC converter 602. First transconductance amplifier 628 has a gain (transconductance) of gm*x, where x is a scaling factor analogous to that discussed above with respect to FIG. 1.

Current source 656 is electrically coupled between an electrical node 658 and a non-inverting input of second transconductance amplifier 630, where electrical node 658 is, for example, a power node or reference node 620. Resistor 654 is electrically coupled between the non-inverting input of second transconductance amplifier 630 and remote output node 622. Current from current source 656 flows through resistor 654 to establish a reference voltage $V_{ref\_2}$, where $V_{ref\_2}$ is a desired output voltage of switching DC-to-DC converter 602, such as a desired value of remote output voltage $V_{o\_R}$. An inverting input of second transconductance amplifier 630 is electrically coupled to reference node 620. Accordingly, second transconductance amplifier 630 is configured to generate a second amplifier output current signal $i_{e2}$ proportional to a difference between (i) the desired output voltage of switching DC-to-DC converter 602 and (ii) the output voltage of the switching DC-to-DC converter 602 at remote output node 622. Second transconductance amplifier 630 has a gain (transconductance) of gm, where gm is the same as discussed above with respect to first transconductance amplifier 628.

Summing circuitry 632 includes a summing node 640 and a compensator 642 which are analogous to summing node 140 and compensator 142, respectively. Accordingly, summing circuitry 632 is configured to generate a control signal $V_c$ for controlling switching DC-to-DC converter 602 based on a sum of first amplifier output current signal $i_{e2}$ and second amplifier output current signal $i_{e2}$. Specifically, summing node 640 is electrically coupled to the output of first transconductance amplifier 628, the output of second transconductance amplifier 630, and switching control circuitry 608. Switching control circuitry 608 has a high input impedance such that negligible electric current flows from summing node 640 to switching control circuitry 608. Consequently, summing node 640 sums each of first amplifier output current signal $i_{e1}$ and second amplifier output current signal $i_{e2}$ to generate a combined current signal $i_c$ flowing from summing node 640 into compensator 642. Compensator 642 is electrically coupled between summing node 640 and local output node 618, and compensator 642 is an impedance element that is configured to convert combined current signal $i_c$ to control signal $V_c$. For example, in certain embodiments, compensator 642 includes an RC network electrically coupled between summing node 640 and local output node 618, where (i) the RC network is selected to achieve a desired closed-loop frequency response of switching DC-to-DC converter 602 and (ii) control signal $V_c$ is equal to the product of combined current signal $i_c$ and impedance of the RC network.

Switching control circuitry 608 is analogous to switching control circuitry 108 of FIG. 1, and switching control circuitry 608 is configured to control switching stage 612 by generating controls signals Φ1 and Φ2 as a function of control signal $V_c$. Control signal Φ1 controls a control switching device (not shown in FIG. 6) of switching stage 612, and control signal Φ2 controls a freewheeling switching device (not shown in FIG. 6) of switching stage 612. Examples of a control switching device of switching stage 612 and a freewheeling switching device of switching stage 612 are discussed below with respect to FIG. 7. Hybrid sensing circuit 606 and switching control circuitry 608 collectively modulate duty cycle of the control switching device via control signals $V_c$ and Φ1 to regulate magnitude of local output voltage $V_{o\_L}$ and remote output voltage $V_{o\_R}$. Switching control circuitry 608 controls the freewheeling switching device such that the freewheeling switching device provides a path for current flowing through an inductor (not shown in FIG. 6) of first LC filter 614 when the control switching devices is in its off-state. In some embodiments, the freewheeling switching device of switching stage 612 is replaced with a diode, and switching control circuitry 608 therefore need not be capable of generating control signal Φ2.

The configuration of switching control circuitry 608 is a design choice. In some embodiments, switching control circuitry 608 is configured to generate control signals Φ1 and Φ2 as a function of control signal $V_c$ using a PWM technique or a PFM technique. In some embodiments, switching control circuitry 608 is embodied similar to switching control circuitry 200 of FIG. 2.

EQNS. 1-4, discussed above with respect to electrical environment 100 of FIG. 1, are also applicable to electrical environment 600 of FIG. 6. Accordingly, in particular embodiments, a ratio of a gain (transconductance gm*x) $G_1$ of first transconductance amplifier 628 to a gain (transconductance gm) $G_2$ of second transconductance amplifier 630 is specified by EQN. 5 below, where $C_1$ is capacitance of the capacitor of first LC filter 614 and $C_2$ is capacitance of capacitor 626 of second LC filter 604, so that the double-zero generated by hybrid sensing circuit 606 compensates for the double-pole introduced by second LC filter 604. As such, in particular embodiments, gain (transconductance gm*x) $G_1$ of first transconductance amplifier 628 will be different from a gain (transconductance gm) $G_2$ of second transconductance amplifier 630 unless $C_1$ is equal to $C_2$.

$$\frac{G_1}{G_2} = \frac{C_1}{C_2} \qquad \text{(EQN. 5)}$$

Figure 7:
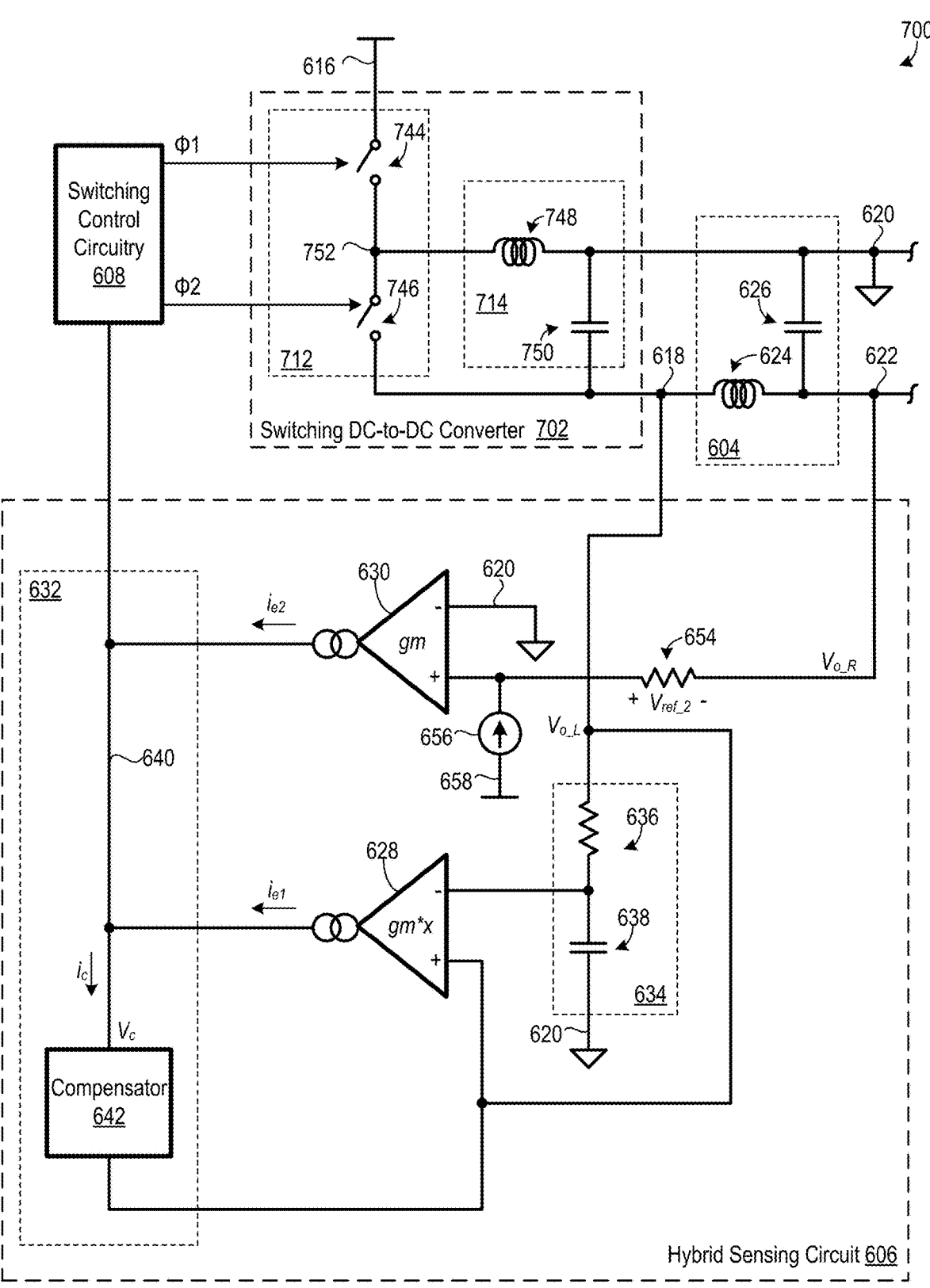
FIG. 7 is a schematic diagram of an embodiment of the FIG. 6 electrical environment where the switching DC-to-DC converter has a buck-boost topology.

FIG. 7 is a schematic diagram of an electrical environment 700, which is an embodiment of electrical environment 600 (FIG. 6) where switching DC-to-DC converter 602 is embodied by a switching DC-to-DC converter 702 having a buck-boost topology. Switching DC-to-DC converter 602, though, is not limited to the example embodiment of FIG. 7. Load 610 is not shown in FIG. 7 for illustrative clarity. Switching stage 612 and first LC filter 614 of FIG. 6 are embodied by a switching stage 712 and a first LC filter 714, respectively, in FIG. 7. Switching stage 712 includes a control switching device 744 and a freewheeling switching device 746, and first LC filter 714 includes an inductor 748 and a capacitor 750. Control switching device 744 is controlled by control signal Φ1, and control switching device 744 is electrically coupled between input node 616 and a switching node 752. Freewheeling switching device 746 is controlled by control signal Φ2, and freewheeling switching device 746 is electrically coupled between switching node 752 and local output node 618. Inductor 748 is electrically coupled between switching node 752 and reference node 620, and capacitor 750 is electrically coupled between local output node 618 and reference node 620. Capacitance of capacitor 750 is an example of capacitance $C_1$ discussed above with respect to EQN. 5.

Figure 8:
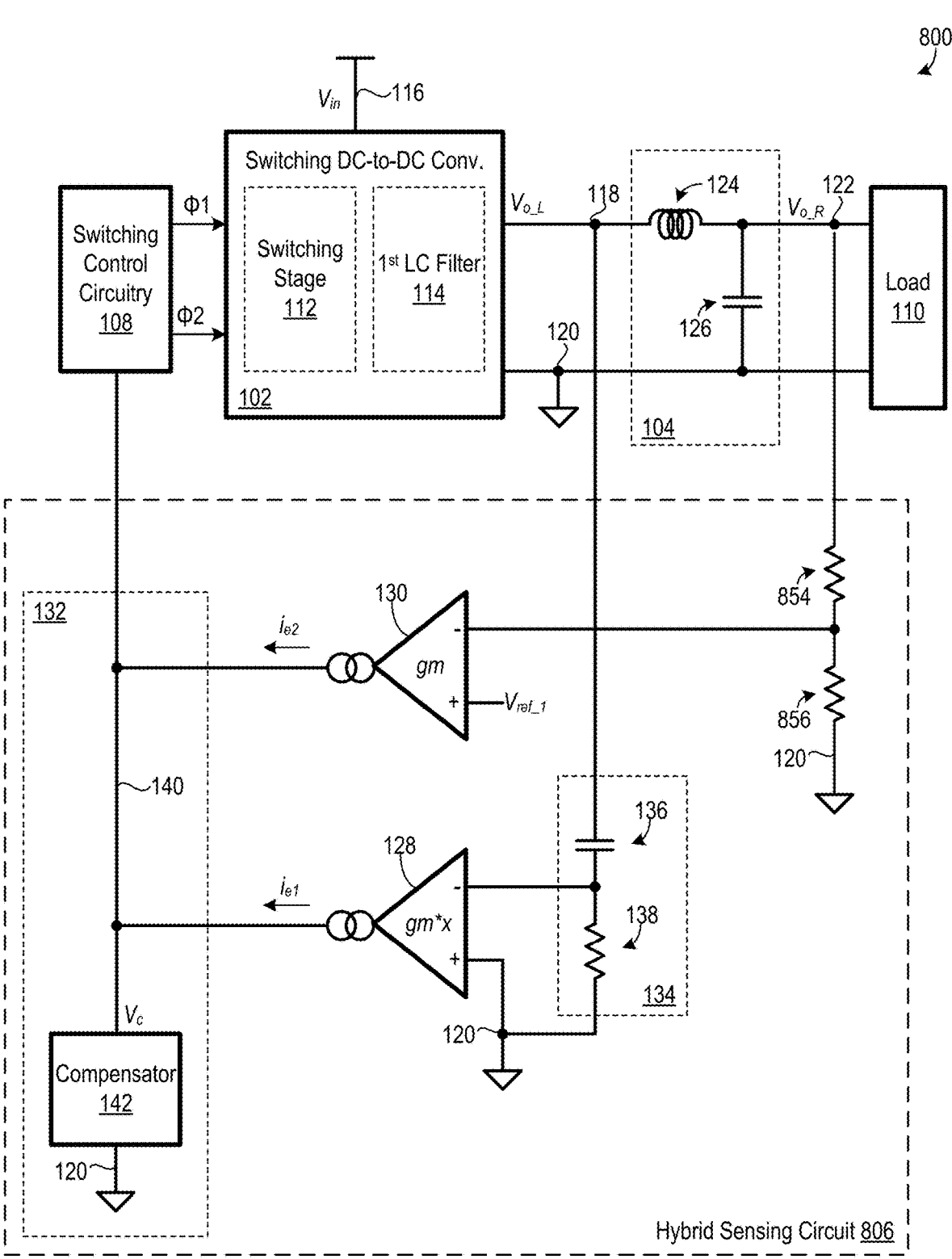
FIG. 8 is a schematic diagram of an electrical environment including an alternate embodiment of the FIG. 1 hybrid sensing circuit having a non-unity feedback gain.

Referring again to FIGS. 1 and 6, modifications to hybrid sensing circuits 106 and 606 are possible. For example, while hybrid sensing circuits 106 and 606 each exhibit unity feedback gain, either hybrid sensing circuit could be modified to have a feedback gain of other than one. For instance, FIG. 8 is a schematic diagram of an electrical environment 800, which differs from electrical environment 100 (FIG. 1) in that hybrid sensing circuit 106 is replaced with a hybrid sensing circuit 806. Hybrid sensing circuit 806 is an alternate embodiment of hybrid sensing circuit 106 that further includes a resistor 854 and a resistor 856 which collectively form a voltage divider and add feedback gain. Resistor 854 is electrically coupled between remote output node 122 and the inverting input of second transconductance amplifier 130, and resistor 856 is electrically coupled between the inverting input of second transconductance amplifier 130 and reference node 120. In contrast to hybrid sensing circuit 106, reference voltage $V_{ref\_1}$ is equal to a scaled value of a desired output voltage of switching DC-to-DC converter 102 as specified in EQN. 6 below, where $V_{des}$ is the desired output voltage of switching DC-to-DC converter 102, $R_{854}$ is resistance of resistor 854, and $R_{856}$ is resistance of resistor 856.

$$V_{ref\_1} = V_{des} \cdot \frac{R_{856}}{R_{854} + R_{856}} \qquad \text{(EQN. 6)}$$

Figure 9:
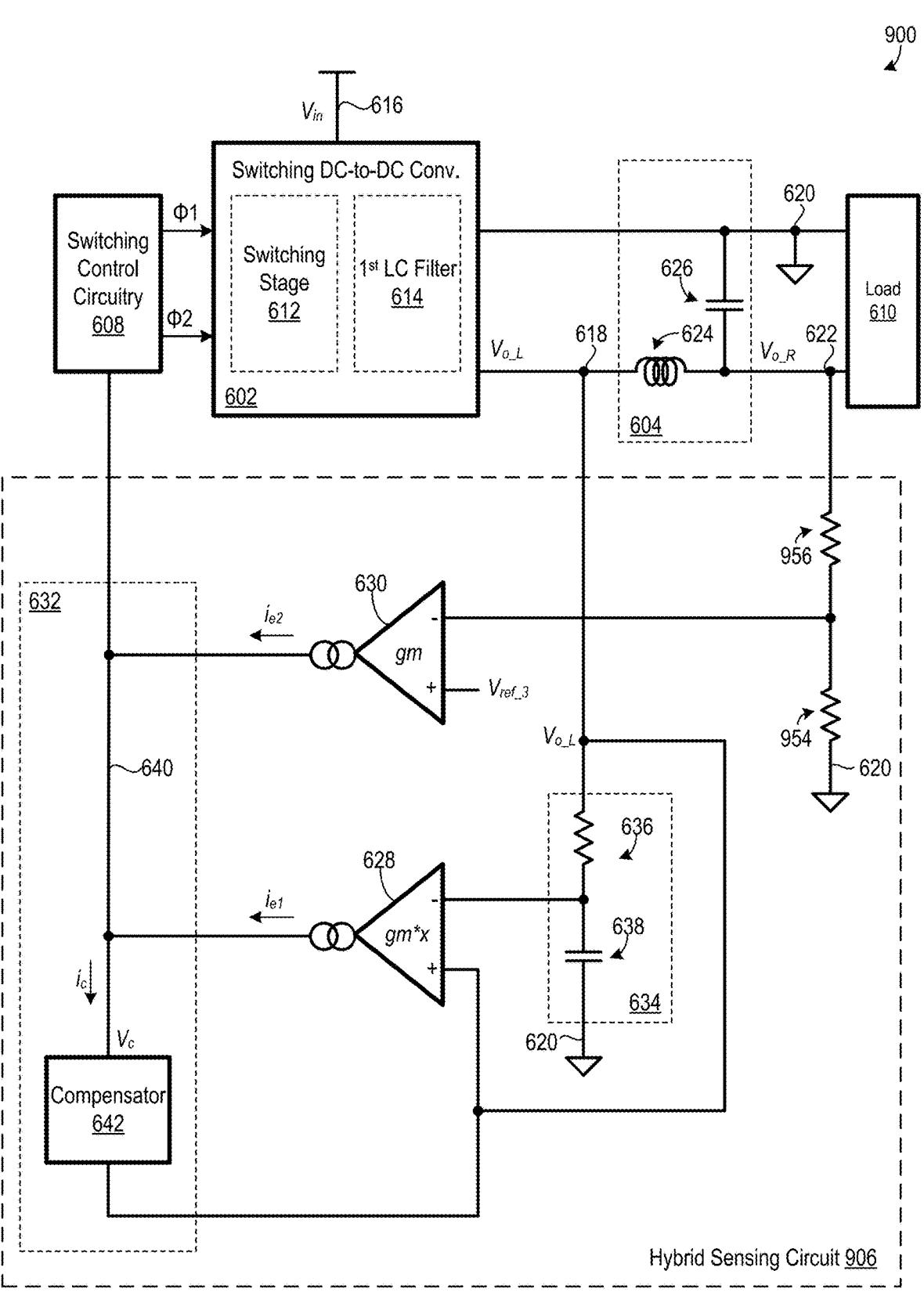
FIG. 9 is a schematic diagram of an electrical environment including an alternate embodiment of the FIG. 6 hybrid sensing circuit having a non-unity feedback gain.

FIG. 9 is a schematic diagram of an electrical environment 900, which differs from electrical environment 600 (FIG. 6) in that hybrid sensing circuit 606 is replaced with a hybrid sensing circuit 906. Hybrid sensing circuit 906 is an alternate embodiment of hybrid sensing circuit 606 that differs from hybrid sensing circuit 606 in that (i) resistor 654 and current source 656 are omitted, (ii) the non-inverting input of second transconductance amplifier 630 receives a reference voltage $V_{ref\_3}$, hybrid sensing circuit 906 further includes a resistor 954 and a resistor 956 collectively forming a voltage divider which adds feedback gain. Resistor 956 is electrically coupled between remote output node 622 and the inverting input of second transconductance amplifier 630, and resistor 954 is electrically coupled between the inverting input of second transconductance amplifier 630 and reference node 620. Reference voltage $V_{ref\_3}$ is equal to a scaled value of a desired output voltage of switching DC-to-DC converter 602 as specified in EQN. 7 below, where $V_{des}$ is the desired output voltage of switching DC-to-DC converter 602, $R_{954}$ is resistance of resistor 954, and $R_{956}$ is resistance of resistor 956. It should be noted that each of $V_{ref\_1}$ and $V_{des}$ is a negative voltage with respect to reference node 620.

$$V_{ref\_3} = V_{des} \cdot \frac{R_{956}}{R_{954} + R_{956}} \quad\quad \text{(EQN. 7)}$$

Figure 10:
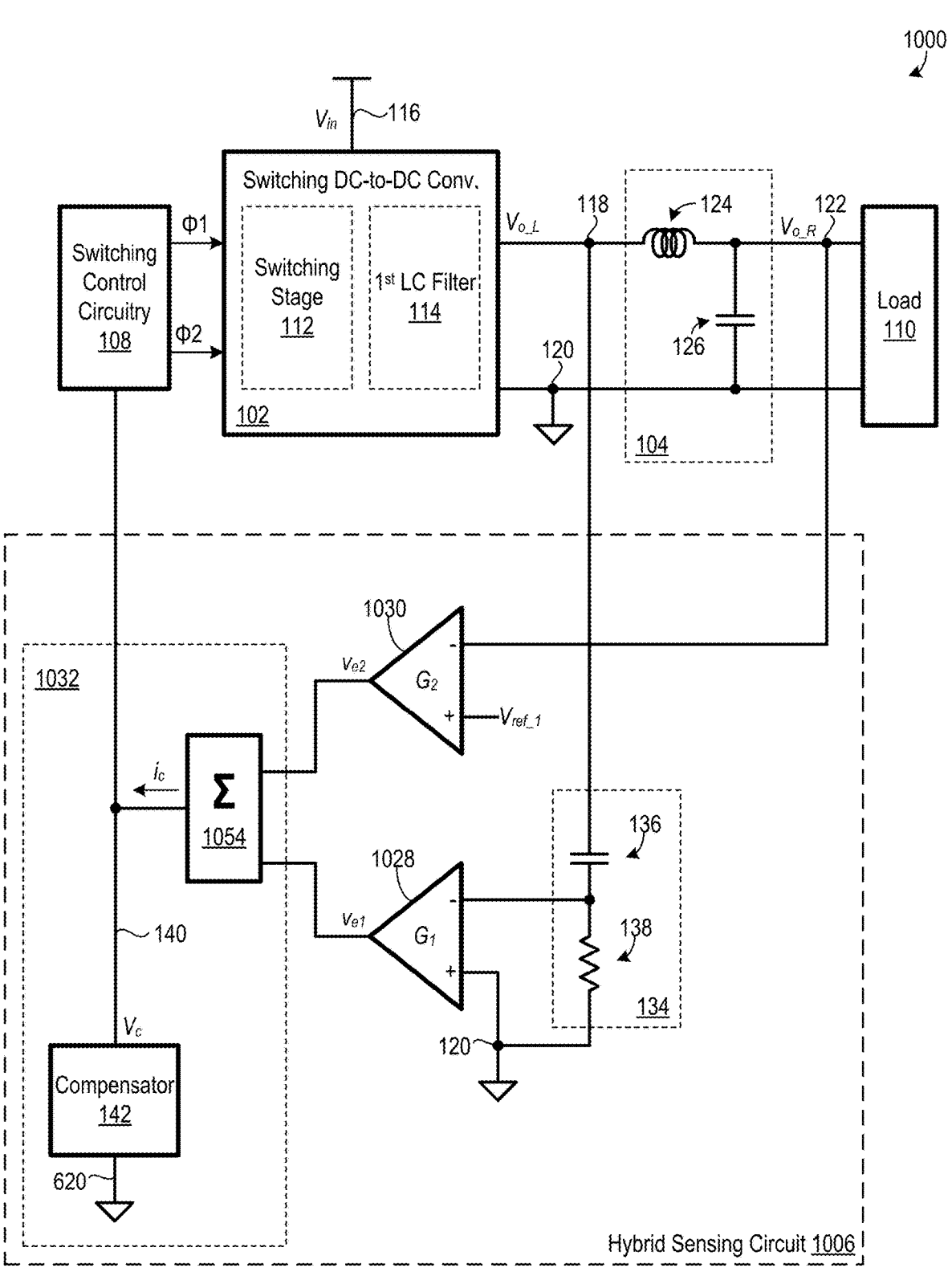
FIG. 10 is a schematic diagram of an electrical environment including an alternate embodiment of the FIG. 1 hybrid sensing circuit where transconductance amplifiers are replaced with voltage amplifiers.

Referring again to FIGS. 1 and 6, as another example of possible changes to hybrid sensing circuit 106 and hybrid sensing circuit 606, the transconductance amplifiers of the hybrid sensing circuits could be replaced with voltage amplifiers, with appropriate changes to summing circuitry 132 and 632. For instance, FIG. 10 is a schematic diagram of an electrical environment 1000, which differs from electrical environment 100 (FIG. 1) in that hybrid sensing circuit 106 is replaced with a hybrid sensing circuit 1006. Hybrid sensing circuit 1006 is an alternate embodiment of hybrid sensing circuit 106 where (i) first transconductance amplifier 128 is replaced with a first voltage amplifier 1028, (ii) second transconductance amplifier 130 is replaced with a second voltage amplifier 1030, and (iii) summing circuitry 132 is replaced with summing circuitry 1032. First voltage amplifier 1028 is configured to generate a first amplifier output voltage signal $v_{e1}$ proportional to a dynamic voltage at local output node 118, and second voltage amplifier 1030 is configured to generate a second amplifier output voltage signal $v_{e2}$ proportional to a difference between (i) the desired output voltage of switching DC-to-DC converter 102 and (ii) the output voltage of the switching DC-to-DC converter 102 at remote output node 122. Summing circuitry 1032 differs from summing circuitry 132 in that summing circuitry 1032 further includes combining circuitry 1054 electrically coupled to each of (i) the output of first voltage amplifier 1028, (i) the output of second voltage amplifier 1030, and (iii) summing node 140. Combining circuitry 1054 is configured to generate combined current signal $i_c$ proportional to a sum of first amplifier output voltage signal $v_{e1}$ and second amplifier output voltage signal $v_{e2}$. Compensator 142 converts combined current signal $i_c$ to control signal $V_c$ as discussed above with respect to FIG. 1. First voltage amplifier 1028 has a gain $G_1$, and second voltage amplifier 1030 has a gain $G_2$, and in certain embodiments, a ratio of gain $G_1$ to gain $G_2$ is as specified by EQN. 4 above, so that the double-zero generated by hybrid sensing circuit 1006 compensates for the double-pole introduced by second LC filter 104.

Figure 11:
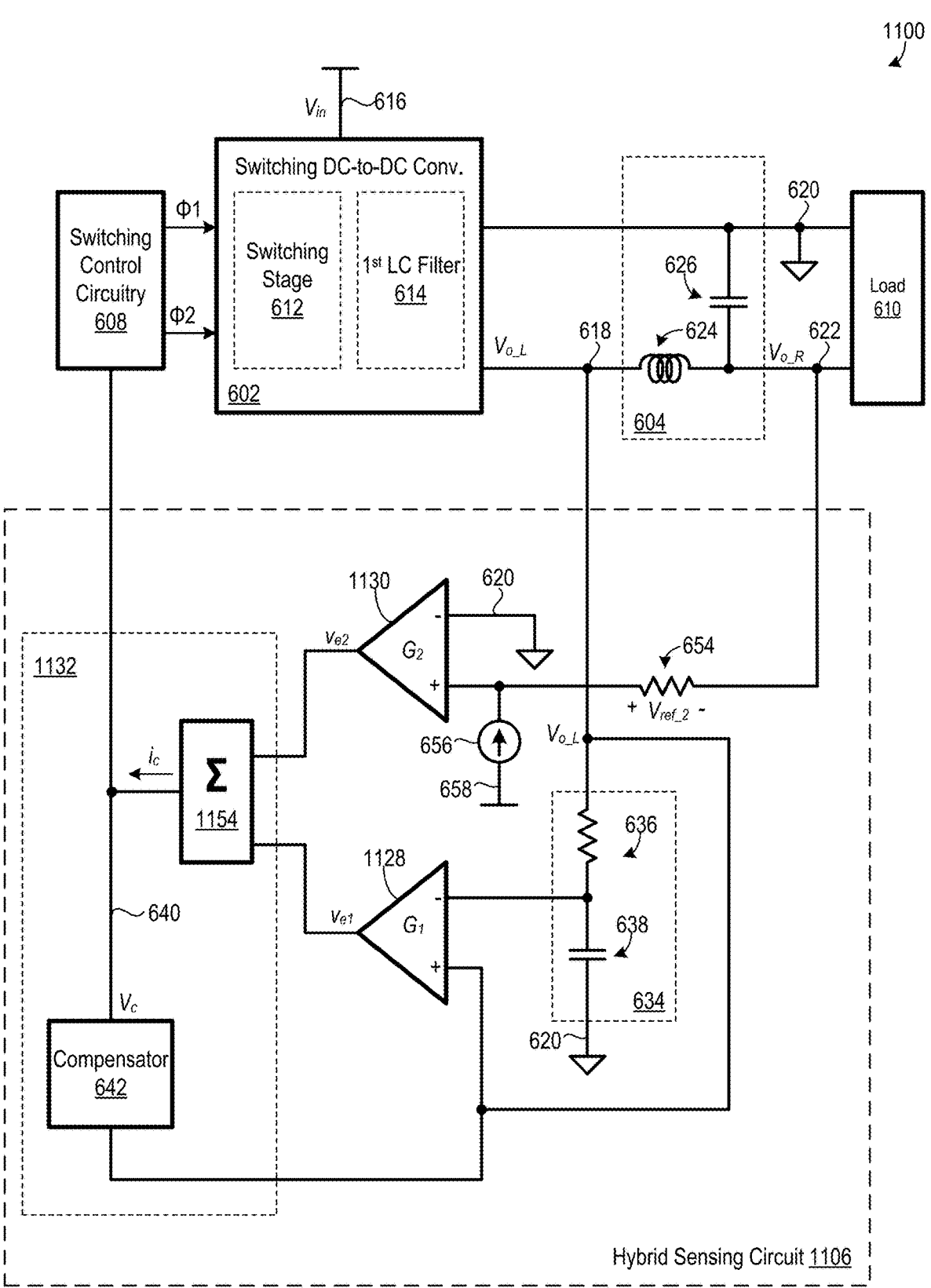
FIG. 11 is a schematic diagram of an electrical environment including an alternate embodiment of the FIG. 6 hybrid sensing circuit where transconductance amplifiers are replaced with voltage amplifiers.

FIG. 11 is a schematic diagram of an electrical environment 1100, which differs from electrical environment 600 (FIG. 6) in that hybrid sensing circuit 606 is replaced with a hybrid sensing circuit 1106. Hybrid sensing circuit 1106 is an alternate embodiment of hybrid sensing circuit 606 where (i) first transconductance amplifier 628 is replaced with a first voltage amplifier 1128, (ii) second transconductance amplifier 630 is replaced with a second voltage amplifier 1130, and (iii) summing circuitry 632 is replaced with summing circuitry 1132. First voltage amplifier 1128 is configured to generate a first amplifier output voltage signal $v_{e1}$ proportional to a dynamic voltage at local output node 618, and second voltage amplifier 1130 is configured to generate a second amplifier output voltage signal $v_{e2}$ proportional to a difference between (i) the desired output voltage of switching DC-to-DC converter 602 and (ii) the output voltage of the switching DC-to-DC converter 602 at remote output node 622. Summing circuitry 1132 differs from summing circuitry 632 in that summing circuitry 1132 further includes combining circuitry 1154 electrically coupled to each of (i) the output of first voltage amplifier 1128, (i) the output of second voltage amplifier 1130, and (iii) summing node 640. Combining circuitry 1154 is configured to generate combined current signal $i_c$ proportional to a sum of first amplifier output voltage signal $v_{e1}$ and second amplifier output voltage signal $v_{e2}$. Compensator 642 converts combined current signal $i_c$ to control signal $V_c$ as discussed above with respect to FIG. 6. First voltage amplifier 1128 has a gain $G_1$, and second voltage amplifier has a gain $G_2$, and in certain embodiments, a ratio of gain $G_1$ to gain $G_2$ is as specified by EQN. 5 above, so that the double-zero generated by hybrid sensing circuit 1106 compensates for the double-pole introduced by second LC filter 604.

Figure 12:
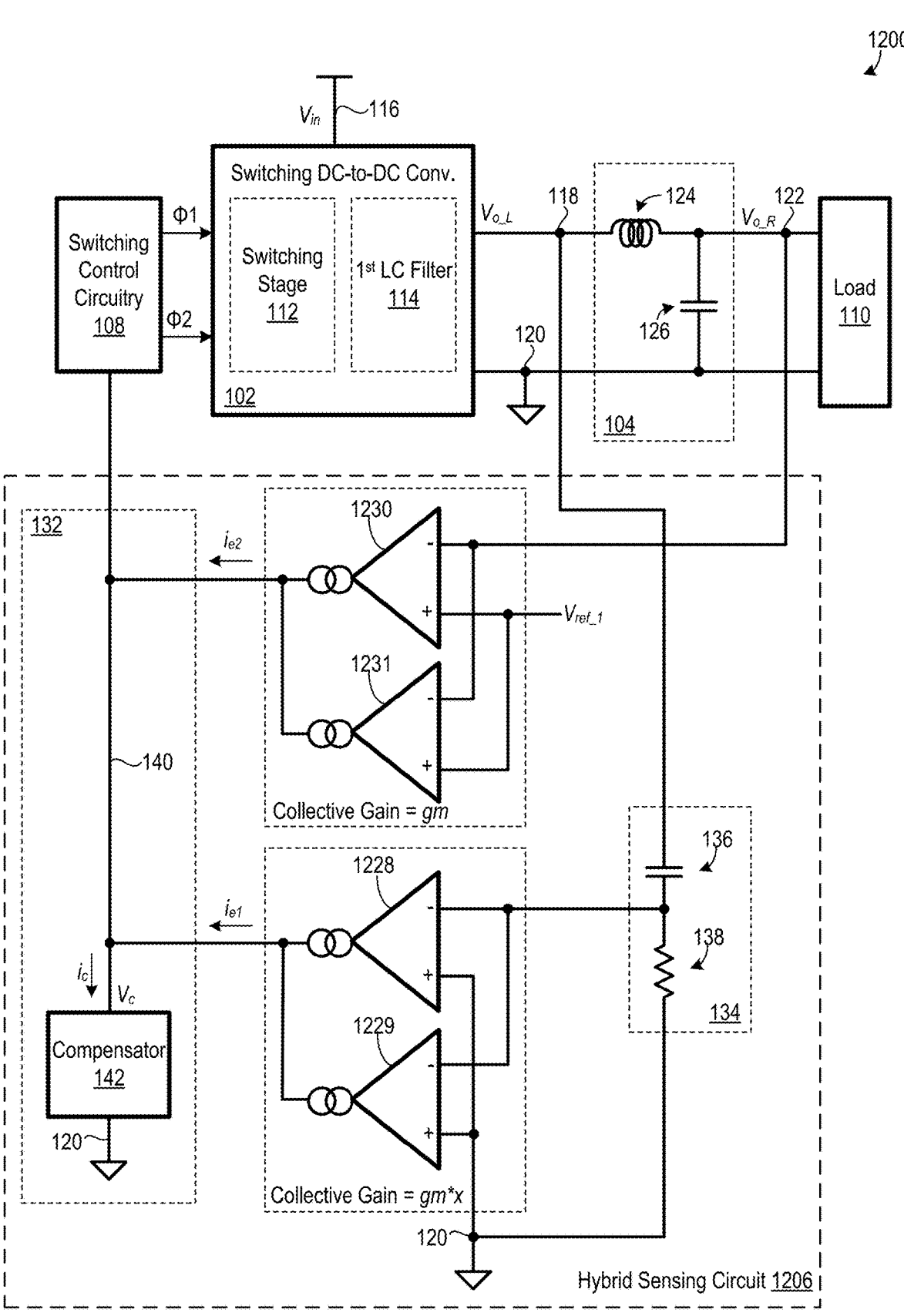
FIG. 12 is a schematic diagram of an electrical environment including an alternate embodiment of the FIG. 1 hybrid sensing circuit with additional amplifiers.

Any of the hybrid sensing circuits discussed above could be modified to include two or more first amplifiers and/or two or more second amplifiers. For example, FIG. 12 is a schematic diagram of an electrical environment 1200, which differs from electrical environment 100 (FIG. 1) in that hybrid sensing circuit 106 is replaced with a hybrid sensing circuit 1206. Hybrid sensing circuit 1206 is an alternate embodiment of hybrid sensing circuit 106 where (i) first transconductance amplifier 128 is replaced with two first transconductance amplifiers 1228 and 1229 electrically coupled in parallel and (ii) second transconductance amplifier 130 is replaced with two second transconductance amplifiers 1230 and 1231 electrically coupled in parallel. First transconductance amplifiers 1228 and 1229 are configured to collectively generate first amplifier output current signal $i_{e1}$ proportional to a dynamic voltage at local output node 118, and second transconductance amplifiers 1230 and 1231 are configured to collectively generate second amplifier output current signal $i_{e2}$ proportional to a difference between (i) the desired output voltage of switching DC-to-DC converter 102 and (ii) the output voltage of the switching DC-to-DC converter 102 at remote output node 122. First transconductance amplifiers 1228 and 1229 have a collective gain (transconductance gm\*x) of $G_1$, and second transconductance amplifiers 1230 and 1231 have a collective gain (transconductance gm) of $G_2$. In some embodiments, a ratio of gain $G_1$ to gain $G_2$ is as specified by EQN. 4 above, so that the double-zero generated by hybrid sensing circuit 1206 compensates for the double-pole introduced by second LC filter 104. Hybrid sensing circuit 1206 could be modified to include one or more additional first transconductance amplifiers and/or one or more additional second transconductance amplifiers.

Figure 13:
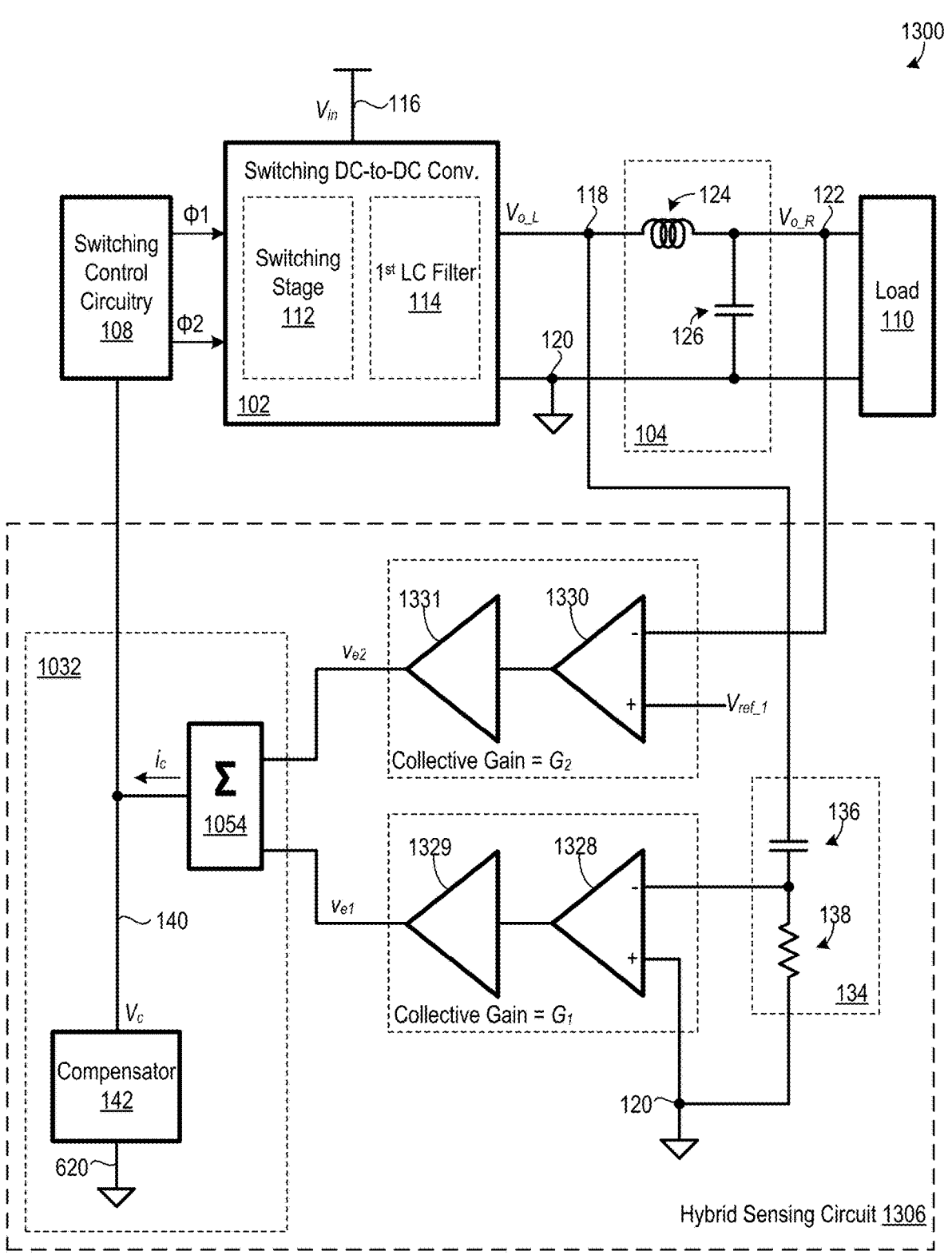
FIG. 13 is a schematic diagram of an electrical environment including an alternate embodiment of the FIG. 10 hybrid sensing circuit with additional amplifiers.

As another example of a hybrid sensing circuit including additional amplifiers, FIG. 13 is a schematic diagram of an electrical environment 1300, which differs from electrical environment 1000 (FIG. 10) in that hybrid sensing circuit 1006 is replaced with a hybrid sensing circuit 1306. Hybrid sensing circuit 1306 is an alternate embodiment of hybrid sensing circuit 1006 where (i) first voltage amplifier 1028 is replaced with two first voltage amplifiers 1328 and 1329 electrically coupled in series and (ii) second voltage amplifier 1030 is replaced with two second voltage amplifiers 1330 and 1331 electrically coupled in series. First voltage amplifiers 1328 and 1329 are configured to collectively generate first amplifier output voltage signal $v_{e1}$ proportional to a dynamic voltage at local output node 118, and second voltage amplifiers 1330 and 1331 are configured to collectively generate second amplifier output voltage signal $v_{e2}$ proportional to a difference between (i) the desired output voltage of switching DC-to-DC converter 102 and (ii) the output voltage of the switching DC-to-DC converter 102 at remote output node 122. First voltage amplifiers 1328 and 1329 have a collective gain of $G_1$, and second voltage amplifiers 1330 and 1331 have a collective gain of $G_2$, and in certain embodiments, a ratio of gain $G_1$ to gain $G_2$ is as specified by EQN. 4 above, so that the double-zero generated by hybrid sensing circuit 1306 compensates for the double-pole introduced by second LC filter 104. Hybrid sensing circuit 1306 could be modified to include one or more additional first voltage amplifiers and/or one or more additional second voltage amplifiers.

Combinations of Features

Features described above may be combined in various ways without departing from the scope hereof. The following examples illustrate some possible combinations.

(A1) A method for generating a control signal for controlling a switching direct-current-to-direct-current (DC-to-DC) converter where (i) the switching DC-to-DC converter includes a first inductor-capacitor (LC) filter and (ii) a second LC filter is electrically coupled between a local output node of the switching DC-to-DC converter and a remote output node of the switching DC-to-DC converter. The method includes (1) using one or more first amplifiers, generating a first amplifier output signal proportional to a dynamic voltage at the local output node, (2) using one or more second amplifiers, generating a second amplifier output signal proportional to a difference between (i) a desired output voltage of the switching DC-to-DC converter and (ii) an output voltage of the switching DC-to-DC converter at the remote output node, and (3) generating the control signal based on a sum of the first amplifier output signal and the second amplifier output signal.

(A2) In the method denoted as (A1), (1) the first amplifier output signal may be a first current signal, (2) the second amplifier output signal may be a second current signal, and (3) generating the control signal based on the sum of the first amplifier output signal and the second amplifier output signal may include (i) summing the first current signal and second current signal to generate a combined current signal and (ii) applying the combined current signal to a compensator, to generate the control signal.

(A3) In the method denoted as (A1), (1) the first amplifier output signal may be a first voltage signal and (2) the second amplifier output signal may be a second voltage signal.

(A4) In any one of the methods denoted as (A1) through (A3), a ratio of a gain of the one or more first amplifiers to a gain of the one or more second amplifiers may be a function of a ratio of a capacitance of the first LC filter to a capacitance of the second LC filter.

(A5) In any one of the methods denoted as (A1) through (A4), the switching DC-to-DC converter may have an inverting topology.

(A6) In the method denoted as (A5), the inverting topology may be buck-boost topology.

(A7) In any one of the methods denoted as (A1) through (A4), the switching DC-to-DC converter may have a non-inverting topology.

(A8) In the method denoted as (A7), the non-inverting topology may be selected from the group consisting of a buck topology and a boost topology.

(B1) A hybrid sensing circuit for generating a control signal for controlling a switching direct-current-to-direct-current (DC-to-DC) converter where (i) the switching DC-to-DC converter includes a first inductor-capacitor (LC) filter and (ii) a second LC filter is electrically coupled between a local output node of the switching DC-to-DC converter and a remote output node of the switching DC-to-DC converter. The hybrid sensing circuit includes (1) one or more first amplifiers configured to generate a first amplifier output signal proportional to a dynamic voltage at the local output node, (2) one or more second amplifiers configured to generate a second amplifier output signal proportional to a difference between (i) a desired output voltage of the switching DC-to-DC converter and (ii) an output voltage of the switching DC-to-DC converter at the remote output node, and (3) summing circuitry configured to generate a control signal for controlling the switching DC-to-DC converter based on a sum of the first amplifier output signal and the second amplifier output signal.

(B2) In the hybrid sensing circuit denoted as (B1), (1) the one or more first amplifiers may include one or more first transconductance amplifiers and the first amplifier output signal may be a first current signal and (2) the one or more second amplifiers may include one or more second transconductance amplifiers and the second amplifier output signal may be a second current signal.

(B3) In the hybrid sensing circuit denoted as (B2), the summing circuitry may include (1) a summing node configured to sum each of the first current signal and the second current signal to generate a combined current signal and (2) a compensator configured to generate the control signal from the combined current signal.

(B4) Any one of the hybrid sensing circuits denoted as (B1) through (B3) may further include one of (i) a high pass filter electrically coupling an input of the one or more first amplifiers to the local output node and (ii) a low pass filter electrically coupling the input of the one or more first amplifiers to the local output node.

(B5) Any one of the hybrid sensing circuits denoted as (B1) through (B4) may further include a voltage divider electrically coupling an input of the one or more second amplifiers to the remote output node.

(C1) An electrical environment includes (1) a switching direct-current-to-direct-current (DC-to-DC) converter including a switching stage and a first inductor-capacitor (LC) filter, (2) a second LC filter electrically coupled between a local output node of the switching DC-to-DC converter and a remote output node of the switching DC-to-DC converter, (3) one or more first amplifiers configured to generate a first amplifier output signal proportional to a dynamic voltage at the local output node, (4) one or more second amplifiers configured to generate a second amplifier output signal proportional to a difference between (i) a desired output voltage of the switching DC-to-DC converter and (ii) an output voltage of the switching DC-to-DC converter at the remote output node, (5) summing circuitry configured to generate a control signal for controlling the switching DC-to-DC converter based on a sum of the first amplifier output signal and the second amplifier output signal, and (6) switching control circuitry configured to control the switching stage as a function of the control signal.

(C2) In the electrical environment denoted as (C1), (1) the one or more first amplifiers may include one or more first transconductance amplifiers and the first amplifier output signal may be a first current signal and (2) the one or more second amplifiers may include one or more second transconductance amplifiers and the second amplifier output signal may be a second current signal.

(C3) In the electrical environment denoted as (C2), the summing circuitry may include (1) a summing node configured to sum each of the first current signal and the second current signal to generate a combined current signal and (2) a compensator configured to generate the control signal from the combined current signal.

(C4) In the electrical environment denoted as (C1), (1) the one or more first amplifiers may include one or more first voltage amplifiers and the first amplifier output signal may be a first voltage signal and (2) the one or more second amplifiers may include one or more second voltage amplifiers and the second amplifier output signal may be a second voltage signal.

(C5) Any one of the electrical environments denoted as (C1) through (C4) may further include one of (i) a high pass filter electrically coupling an input of the one or more first amplifiers to the local output node and (ii) a low pass filter electrically coupling the input of the one or more first amplifiers to the local output node.

(C6) In any one of the electrical environments denoted as (C1) through (C5), a ratio of a gain of the one or more first amplifiers to a gain of the one or more second amplifiers may be a function of a ratio of a capacitance of the first LC filter to a capacitance of the second LC filter.

(C7) In any one of the electrical environments denoted as (C1) through (C6), the switching DC-to-DC converter may have a topology selected from the group consisting of a buck topology, a boost topology, and buck-boost topology.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for generating a control signal for controlling a switching direct-current-to-direct-current (DC-to-DC) converter where (i) the switching DC-to-DC converter includes a first inductor-capacitor (LC) filter and (ii) a second LC filter is electrically coupled between a local output node of the switching DC-to-DC converter and a remote output node of the switching DC-to-DC converter, the method comprising:

using one or more first amplifiers, generating a first amplifier output signal as a first current signal proportional to a dynamic voltage at the local output node;

using one or more second amplifiers, generating a second amplifier output signal as a second current signal proportional to a difference between (i) a desired output voltage of the switching DC-to-DC converter and (ii) an output voltage of the switching DC-to-DC converter at the remote output node; and generating the control signal based on a sum of the first amplifier output signal and the second amplifier output signal, comprising:

summing the first current signal and second current signal to generate a combined current signal, and applying the combined current signal to a compensator, to generate the control signal, wherein a ratio of a gain of the one or more first amplifiers to a gain of the one or more second amplifiers is a function of a ratio of a capacitance of the first LC filter to a capacitance of the second LC filter.

2. The method of claim 1, wherein the switching DC-to-DC converter has an inverting topology.

3. The method of claim 2, wherein the inverting topology is buck-boost topology.

4. The method of claim 1, wherein the switching DC-to-DC converter has a non-inverting topology.

5. The method of claim 4, wherein the non-inverting topology is selected from the group consisting of a buck topology and a boost topology.

6. A hybrid sensing circuit for generating a control signal for controlling a switching direct-current-to-direct-current (DC-to-DC) converter where (i) the switching DC-to-DC converter includes a first inductor-capacitor (LC) filter and (ii) a second LC filter is electrically coupled between a local output node of the switching DC-to-DC converter and a remote output node of the switching DC-to-DC converter, the hybrid sensing circuit comprising:

one or more first amplifiers configured to generate a first amplifier output signal as a first current signal proportional to a dynamic voltage at the local output node;

one or more second amplifiers configured to generate a second amplifier output signal as a second current signal proportional to a difference between (i) a desired output voltage of the switching DC-to-DC converter and (ii) an output voltage of the switching DC-to-DC converter at the remote output node; and summing circuitry configured to generate a control signal for controlling the switching DC-to-DC converter based on a sum of the first amplifier output signal and the second amplifier output signal, comprising:

summing the first current signal and second current signal to generate a combined current signal, and applying the combined current signal to a compensator, to generate the control signal, wherein a ratio of a gain of the one or more first amplifiers to a gain of the one or more second amplifiers is a function of a ratio of a capacitance of the first LC filter to a capacitance of the second LC filter.

7. The hybrid sensing circuit of claim 6, further comprising one of (i) a high pass filter electrically coupling an input of the one or more first amplifiers to the local output node and (ii) a low pass filter electrically coupling the input of the one or more first amplifiers to the local output node.

8. The hybrid sensing circuit of claim 6, further comprising a voltage divider electrically coupling an input of the one or more second amplifiers to the remote output node.

9. An electrical system, comprising:

a switching direct-current-to-direct-current (DC-to-DC) converter including a switching stage and a first inductor-capacitor (LC) filter;

a second LC filter electrically coupled between a local output node of the switching DC-to-DC converter and a remote output node of the switching DC-to-DC converter;

one or more first amplifiers configured to generate a first amplifier output signal as a first current signal proportional to a dynamic voltage at the local output node;

one or more second amplifiers configured to generate a second amplifier output signal as a second current signal proportional to a difference between (i) a desired output voltage of the switching DC-to-DC converter and (ii) an output voltage of the switching DC-to-DC converter at the remote output node;

summing circuitry configured to generate a control signal for controlling the switching DC-to-DC converter based on a sum of the first amplifier output signal and the second amplifier output signal, comprising summing the first current signal and second current signal to generate a combined current signal, and applying the combined current signal to a compensator, to generate the control signal; and switching control circuitry configured to control the switching stage as a function of the control signal, wherein a ratio of a gain of the one or more first amplifiers to a gain of the one or more second amplifiers is a function of a ratio of a capacitance of the first LC filter to a capacitance of the second LC filter.

10. The electrical system of claim 9, further comprising one of (i) a high pass filter electrically coupling an input of the one or more first amplifiers to the local output node and (ii) a low pass filter electrically coupling the input of the one or more first amplifiers to the local output node.

11. The electrical system of claim 9, wherein the switching DC-to-DC converter has a topology selected from the group consisting of a buck topology, a boost topology, and buck-boost topology.

* * * * *

18